United States Patent
Takao et al.

(10) Patent No.: US 8,583,311 B2
(45) Date of Patent: Nov. 12, 2013

(54) OVERHEAD WIRE TRANSPORTATION SYSTEM AND CONTROL METHOD THEREOF

(75) Inventors: Kenji Takao, Tokyo (JP); Katsuaki Morita, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/808,317

(22) PCT Filed: Jul. 29, 2011

(86) PCT No.: PCT/JP2011/067499
§ 371 (c)(1),
(2), (4) Date: Jan. 4, 2013

(87) PCT Pub. No.: WO2012/015042
PCT Pub. Date: Feb. 2, 2012

(65) Prior Publication Data
US 2013/0110338 A1    May 2, 2013

(30) Foreign Application Priority Data
Jul. 30, 2010   (JP) .................................. 2010-172145

(51) Int. Cl.
*G06F 17/00*   (2006.01)
(52) U.S. Cl.
USPC ...... 701/22; 711/1; 711/4; 711/100; 711/104; 711/110; 257/678; 257/679; 257/730; 257/732; 374/102; 374/178; 318/139
(58) Field of Classification Search
USPC ............ 701/22; 711/1, 4, 100, 104, 110, 115; 257/679, 678, 730, 732; 374/102, 178; 326/86, 155; 365/221; 320/109; 318/139; 368/202; 379/413; 235/462.44, 441, 492, 472.03
See application file for complete search history.

(56) References Cited

U.S. PATENT DOCUMENTS

| | | | | |
|---|---|---|---|---|
| 5,461,299 A * | 10/1995 | Bruni | ............................ | 320/108 |
| 7,162,337 B2 * | 1/2007 | Peltz et al. | ..................... | 701/19 |
| 8,428,796 B2 * | 4/2013 | Donnelly | ........................ | 701/19 |
| 2008/0246507 A1 * | 10/2008 | Gunn et al. | .................... | 324/771 |
| 2008/0266920 A1 * | 10/2008 | Terunuma et al. | ............ | 363/124 |
| 2010/0114404 A1 * | 5/2010 | Donnelly | ......................... | 701/2 |

(Continued)

FOREIGN PATENT DOCUMENTS

| | | |
|---|---|---|
| JP | 11-091415 | 4/1999 |
| JP | 2001-287572 | 10/2001 |

(Continued)

OTHER PUBLICATIONS

Obaid et al., Automatic Guidance System for Trolley-Powered Mining Haul Trucks, 2009, IEEE, p. 1-6.*

(Continued)

*Primary Examiner* — McDieunel Marc
(74) *Attorney, Agent, or Firm* — Wenderoth, Lind & Ponack, L.L.P.

(57) ABSTRACT

A storage battery control device detects an overhead wire supply current value showing a sum of a current value output from a storage battery and a current value output from a transformer substation, and charging or discharging of the storage battery is controlled so that a charging rate of the storage battery becomes a charging rate target value when the detected overhead wire supply current value is less than a first threshold. In addition, charging or discharging of the storage battery is controlled so that the output voltage of the storage battery control device is maintained at a constant voltage control mode when the detected overhead wire supply current value is greater than or equal to the first threshold.

9 Claims, 6 Drawing Sheets

(56) References Cited

U.S. PATENT DOCUMENTS

| | | | |
|---|---|---|---|
| 2010/0211340 A1* | 8/2010 | Lowenthal et al. | 702/63 |
| 2011/0095604 A1* | 4/2011 | Bavard et al. | 307/12 |
| 2012/0119702 A1* | 5/2012 | Gaul et al. | 320/109 |
| 2013/0009595 A1* | 1/2013 | Brown | 320/108 |
| 2013/0073125 A1* | 3/2013 | Araki et al. | 701/19 |

FOREIGN PATENT DOCUMENTS

| | | |
|---|---|---|
| JP | 2005-206111 | 8/2005 |
| JP | 2006-034041 | 2/2006 |
| JP | 2009-67205 | 4/2009 |
| JP | 2009-171772 | 7/2009 |

OTHER PUBLICATIONS

International Search Report issued Oct. 11, 2011 in International (PCT) Application No. PCT/JP2011/067499 with English translation.

Written Opinion of the International Searching Authority issued Oct. 11, 2011 in in International (PCT) Application No. PCT/JP2011/067499 with English translation.

\* cited by examiner

OVERHEAD WIRE TRANSPORTATION SYSTEM AND CONTROL METHOD THEREOF

TECHNICAL FIELD

The present invention relates to an overhead wire transportation system in which a vehicle travels by electric power obtained from an overhead wire connected to a transformer substation, and a control method thereof.

This application claims priority to and the benefit of Japanese Patent Application No. 2010-172145 filed on Jul. 30, 2010, the disclosures of which are incorporated by reference herein.

BACKGROUND ART

Electric power consumption of a vehicle such as an electric railcar or the like that obtains electric power sent from a transformer substation from an overhead wire and travels by the electric power is obtained by integration of an overhead wire voltage applied to the vehicle and a current flowing from the overhead wire to the vehicle. Here, in the vehicle, vehicle equipment such as an IGBT (an insulating gate bipolar transistor), a reactor, a transformer, or the like, which is allowable as a performance even when a large current is introduced, is installed in an electric instrument (an inverter, an SIV, or the like) in the vehicle.

However, since the vehicle equipment such as the IGBT, reactor, transformer, or the like has a large current capacity and a high price, vehicle equipment having a smaller current capacity should be used in consideration of reducing power consumption. In addition, techniques related to the application are disclosed in Patent Document 1.

RELATED DOCUMENT

Patent Document

[Patent Document 1] Japanese Unexamined Patent Application, First Publication No. H11-91415

SUMMARY OF THE INVENTION

Problem to be Solved by the Invention

Here, an object of the present invention is to provide an overhead wire transportation system and a control method thereof that are capable of solving the above-mentioned problems.

Means for Solving the Problem

In order to accomplish the above-mentioned object, the present invention provides an overhead wire transportation system in which a vehicle travels by electric power obtained from an overhead wire connected to a transformer substation, the overhead wire transportation system including: a storage battery which stores the electric power obtained from the overhead wire; and a storage battery control device which controls charging or discharging of the storage battery, wherein the storage battery control device detects an overhead wire supply current value showing a sum of a current value output from the storage battery control device and a current value output from the transformer substation, a control mode of the storage battery control device is set to a charging rate adjustment mode in which charging or discharging of the storage battery is controlled in such a way that a charging rate of the storage battery becomes a charging rate target value when the detected overhead wire supply current value is less than a first threshold, and the control mode of the storage battery control device is set to a constant voltage control mode in which charging or discharging of the storage battery is controlled in such a way that an output voltage of the storage battery control device is maintained at a constant voltage when the detected overhead wire supply current value is greater than or equal to the first threshold.

In addition, in the overhead wire transportation system of the present invention, the control mode of the storage battery control device is set to a constant current control mode in which discharge of the storage battery is controlled in such a way that the storage battery control device is discharged at a constant value of a predetermined maximum current value when the detected overhead wire supply current value is greater than or equal to a second threshold, the second threshold being a current value higher than the first threshold.

Further, in the overhead wire transportation system of the present invention, the storage battery control device detects the charging rate of the storage battery, and the storage battery control device lowers the first threshold when a rate of change per unit time in a transition from the detected charging rate to the charging rate target value is greater than or equal to a predetermined threshold.

Furthermore, in the overhead wire transportation system of the present invention, the storage battery control device raises the first threshold when a rate of change per unit time in the transition from the detected charging rate to the charging rate target value is less than the predetermined threshold.

In addition, in the overhead wire transportation system of the present invention, the second threshold is a value obtained by adding a maximum current value output from the storage battery control device to a current value shown by the first threshold.

Further, in the overhead wire transportation system of the present invention, in the constant voltage control mode, to control charging or discharging of the storage battery in such a way that an output voltage of the storage battery control device is maintained at a constant voltage, the storage battery control device calculates a minimum overhead wire supply voltage value, which is obtained by adding a voltage drop value from the output voltage of the storage battery control device to an allowable minimum overhead wire voltage value applied to the vehicle, the voltage drop value being a value obtained at a position of the vehicle having allowable minimum overhead wire voltage value, and the storage battery control device controls charging or discharging of the storage battery in such a way that the output voltage of the storage battery control device is maintained at a constant voltage which is more than the minimum overhead wire supply voltage value.

Furthermore, in the overhead wire transportation system of the present invention, the first threshold equals to an overhead wire current value when the output voltage of the storage battery control device is the minimum overhead wire supply voltage value.

In addition, in the overhead wire transportation system of the present invention, the first threshold equals to an overhead wire current value when the overhead wire voltage value applied to the vehicle at a position of the vehicle is the minimum overhead wire supply voltage value, which is not the allowable minimum overhead wire voltage value.

Further, the present invention provides a control method of an overhead wire transportation system, in which a vehicle travels by electric power obtained from an overhead wire connected to a transformer substation, including a storage battery which stores the electric power obtained from the overhead wire; and a storage battery control device which controls charging or discharging of the storage battery, the control method of an overhead wire transportation system comprises the steps of: detecting an overhead wire supply current value showing a sum of a current value output from the storage battery control device and a current value output from the transformer substation in the storage battery control device; and setting a control mode of the storage battery control device to a charging rate adjustment mode in which charging or discharging of the storage battery is controlled in such a way that a charging rate of the storage battery becomes a charging rate target value when the detected overhead wire supply current value is less than a first threshold in the storage battery control device; and setting the control mode of the storage battery control device to a constant voltage control mode in which charging or discharging of the storage battery is controlled in such a way that an output voltage of the storage battery control device is maintained at a constant voltage when the detected overhead wire supply current value is greater than or equal to the first threshold in the storage battery control device.

Effect of the Invention

According to the present invention, the current flowing to the vehicle equipment can be controlled to a small amount which is lower than an allowable capacity, and thus vehicle equipment having a small current capacity can be used. In addition, manufacturing cost of the vehicle can be reduced by using the vehicle equipment having the small current capacity.

MODES FOR CARRYING OUT THE INVENTION

Hereinafter, an overhead wire transportation system according to a first embodiment of the present invention will be described with reference to the accompanying drawings.

Figure 1:
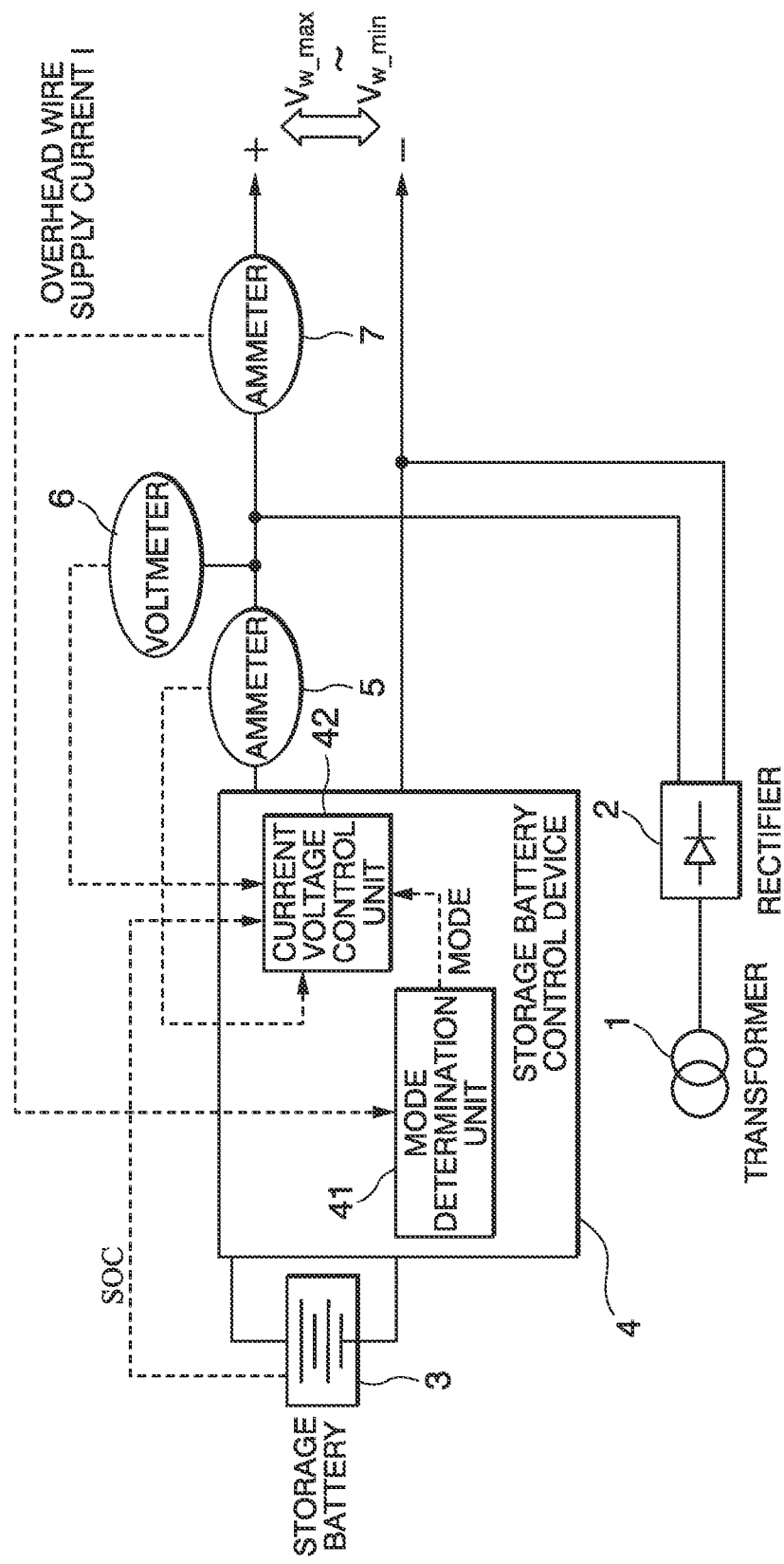
FIG. 1 is a block diagram showing a configuration of an overhead wire transportation system according to a first embodiment.

FIG. 1 is a block diagram showing a configuration of the overhead wire transportation system according to the first embodiment.

As shown in FIG. 1, in the overhead wire transportation system, electric power is supplied to an overhead wire by a direct current feeding method. Specifically, the overhead wire transportation system includes a transformer 1 installed at a transformer substation, a rectifier 2 configured to convert an alternate current output from the transformer 1 into a direct current, a storage battery 3 configured to store electric power, and a storage battery control device 4 configured to control charge or discharge of the storage battery 3. In addition, while not shown in FIG. 1, a vehicle such as an electric railcar receives electric power from the overhead wire and is power running (travels).

Further, the overhead wire transportation system includes an ammeter 5 configured to measure a current value output from the storage battery control device 4, a voltmeter 6 configured to measure an output voltage value of the storage battery control device 4, and an ammeter 7 configured to measure an overhead wire supply current value I, which is a sum of current values output from the rectifier 2 of the transformer substation and the storage battery control device 4, and the storage battery control device 4 is connected to the ammeters 5 and 7 and the voltmeter 6 by a signal line. Then, the storage battery control device 4 obtains the respective current values or voltage values from the ammeters 5 and 7 and the voltmeter 6.

In addition, the storage battery control device 4 includes a mode determination unit 41 and a current voltage control unit 42. The mode determination unit 41 of the storage battery control device 4 is a processing unit configured to determine a mode of controlling the storage battery 3 based on the overhead wire supply current value I input from the ammeter 7. Further, the current voltage control unit 42 performs control of charging or discharging of the storage battery 3 based on the mode determined by the mode determination unit 41. Here, the mode of controlling the storage battery 3 by the current voltage control unit 42 includes three modes, an SOC (State of Charge) adjustment mode, a constant voltage control mode (CV mode), and a constant current control mode (CC mode), in the embodiment. The overhead wire voltage is varied between values of $Vw_{\_mm}$ to $Vw_{\_max}$ according to an increase and a decrease in a load (electric power consumption or the like in the vehicle) shown in FIG. 1.

Figure 2:
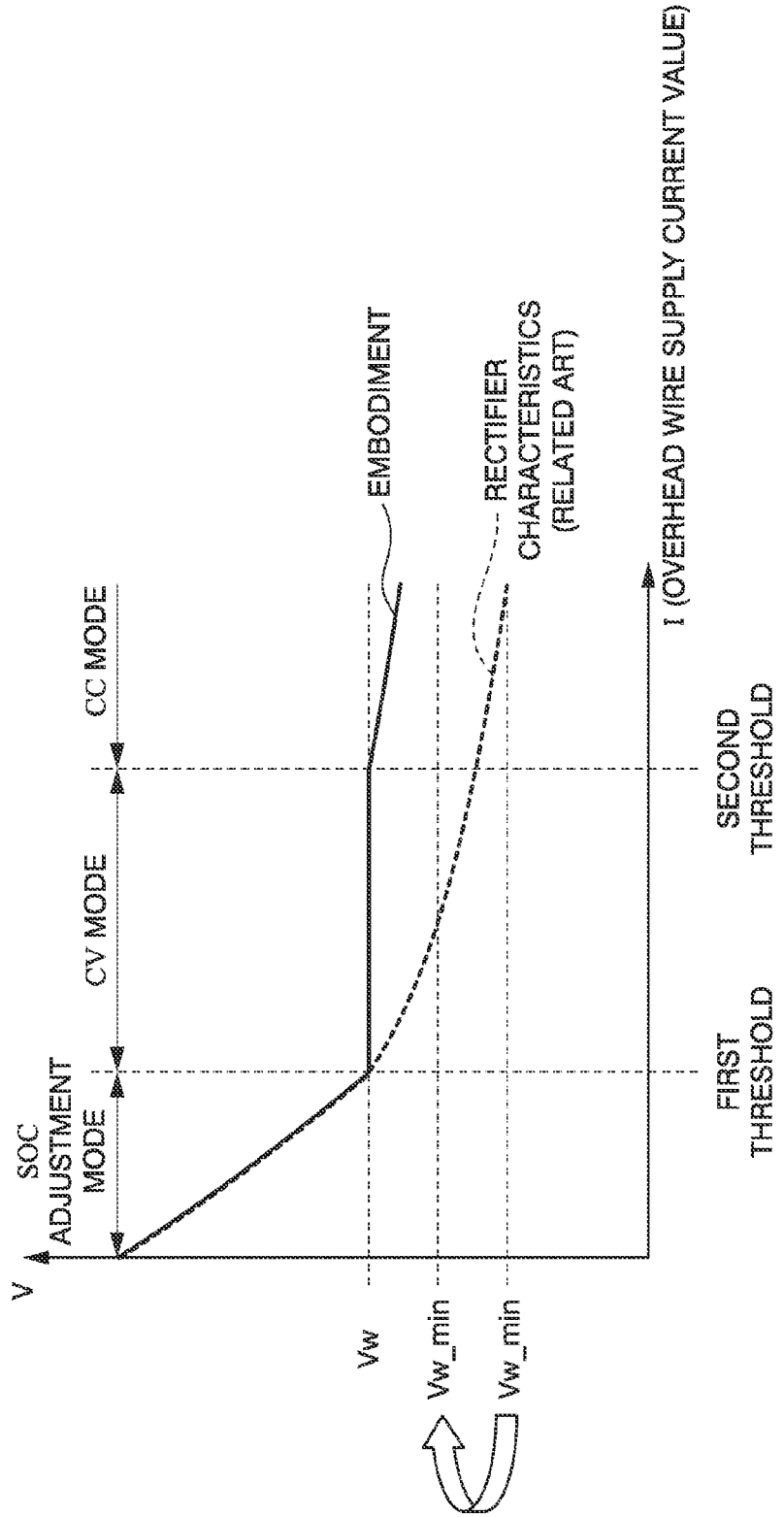
FIG. 2 is a first view showing a control outline of a current voltage control unit.

FIG. 2 is a first view showing a control outline of the current voltage control unit.

As shown in FIG. 2, the current voltage control unit 42 controls charging or discharging of the storage battery 3 in a mode of the SOC adjustment mode when the overhead wire supply current value I detected by the ammeter 7 is less than a first threshold. The SOC adjustment mode is a mode of controlling charging or discharging of the storage battery 3 in such a way that a charging rate of the storage battery 3 becomes a charging rate target value. In addition, when a full charge of the storage battery 3 is assumed as 100%, the charging rate target value is in a range of, for example, 45% to 60%, but the charging rate target value may be one point such as 60% or the like. In the SOC adjustment mode, the current voltage control unit 42 performs control of discharging when the present charging rate of the storage battery 3 is higher than the charging rate target value, and performs control of charging when the present charging rate of the storage battery 3 is lower than the charging rate target value. In addition, a charging rate SOC can be obtained by integration of the current output from the storage battery. Alternately, an open voltage value of the storage battery 3 is detected, and based on information recorded in a table in which a relation between the open voltage value and the charging rate SOC is shown, the storage battery control device 4 may be configured to obtain the charging rate SOC.

In addition, the current voltage control unit 42 controls charging or discharging of the storage battery 3 in a mode using a constant voltage control mode (CV mode) when the overhead wire supply current value I detected by the ammeter 7 is greater than or equal to the first threshold and less than a second threshold. The constant voltage control mode is a mode of controlling charging or discharging of the storage battery 3 in such a way that an output voltage of the storage battery control device 4 is maintained at a constant voltage. In the conventional overhead wire transportation system having no storage battery 3 or storage battery control device 4, the output voltage of the storage battery control device 4 is decreased when the overhead wire supply current value I is increased according to an increase in load. However, by performing the control in the constant voltage control mode, even though the overhead wire supply current value I is increased, the output voltage of the storage battery control device 4 is maintained at a constant level.

In addition, the current voltage control unit 42 controls charging or discharging of the storage battery 3 in a mode as the constant current control mode (CC mode) when the overhead wire supply current value I detected by the ammeter 7 is greater than or equal to the second threshold. The constant current control mode is a mode of controlling discharge of the storage battery 3 in such a way that the storage battery control device 4 is discharged at a constant value of a predetermined maximum current value based on performance of the storage battery 3.

Here, the electric power consumption of the vehicle traveling by receiving the electric power from the overhead wire is obtained by integration of the overhead wire voltage applied to the vehicle and the current flowing from the overhead wire into the vehicle. Then, since a maximum value of the electric power consumption of the vehicle is determined, the current flowing into the vehicle is small according to the voltage level when the overhead wire voltage applied to the vehicle is high. Accordingly, the storage battery control device 4 of the overhead wire system according to the embodiment controls to maintain the output voltage of the storage battery control device 4 at a high level. Therefore, the overhead wire voltage at a position of the vehicle farther than a position of the storage battery control device 4 is also increased, and thus the current flowing into the vehicle is reduced. Accordingly, the vehicle equipment such as an IGBT, an inverter or the like in the electric instrument installed in the vehicle can be replaced with vehicle equipment having a small current capacity.

As shown by dotted lines of FIG. 2, when the storage battery 3 or the storage battery control device 4 according to the embodiment is not installed in the overhead wire system, the overhead wire voltage is reduced inversely proportional to an increase in the overhead wire supply current value I as the load is increased. However, in the embodiment, when the load of the overhead wire transportation system is increased and the overhead wire supply current value I is increased and also exceeded the first threshold, the current voltage control unit 42 of the storage battery control device 4 controls to maintain the voltage at a high level by the constant voltage control mode. Accordingly, the overhead wire voltage at the position of the vehicle is also maintained at a high level, and the current amount flowing into the vehicle is reduced. In addition, when the load of the overhead wire transportation system is further increased and the overhead wire supply current value I is increased and also exceeded the second threshold, the current voltage control unit 42 of the storage battery control device 4 enters the constant current control mode. Before transition to the constant current control mode, since the overhead wire voltage is maintained at a high level by the constant voltage control mode, even after transition to the constant current control mode, the output voltage of the storage battery control device 4 can be maintained at a high level because of the effect of the constant voltage control mode. Accordingly, even when the overhead wire supply current value I exceeds the second threshold to enter the constant current control mode, the overhead wire voltage at the position of the vehicle is maintained at a high level, and the current amount flowing into the vehicle is reduced, because the voltage control mode is performed.

Figure 3:
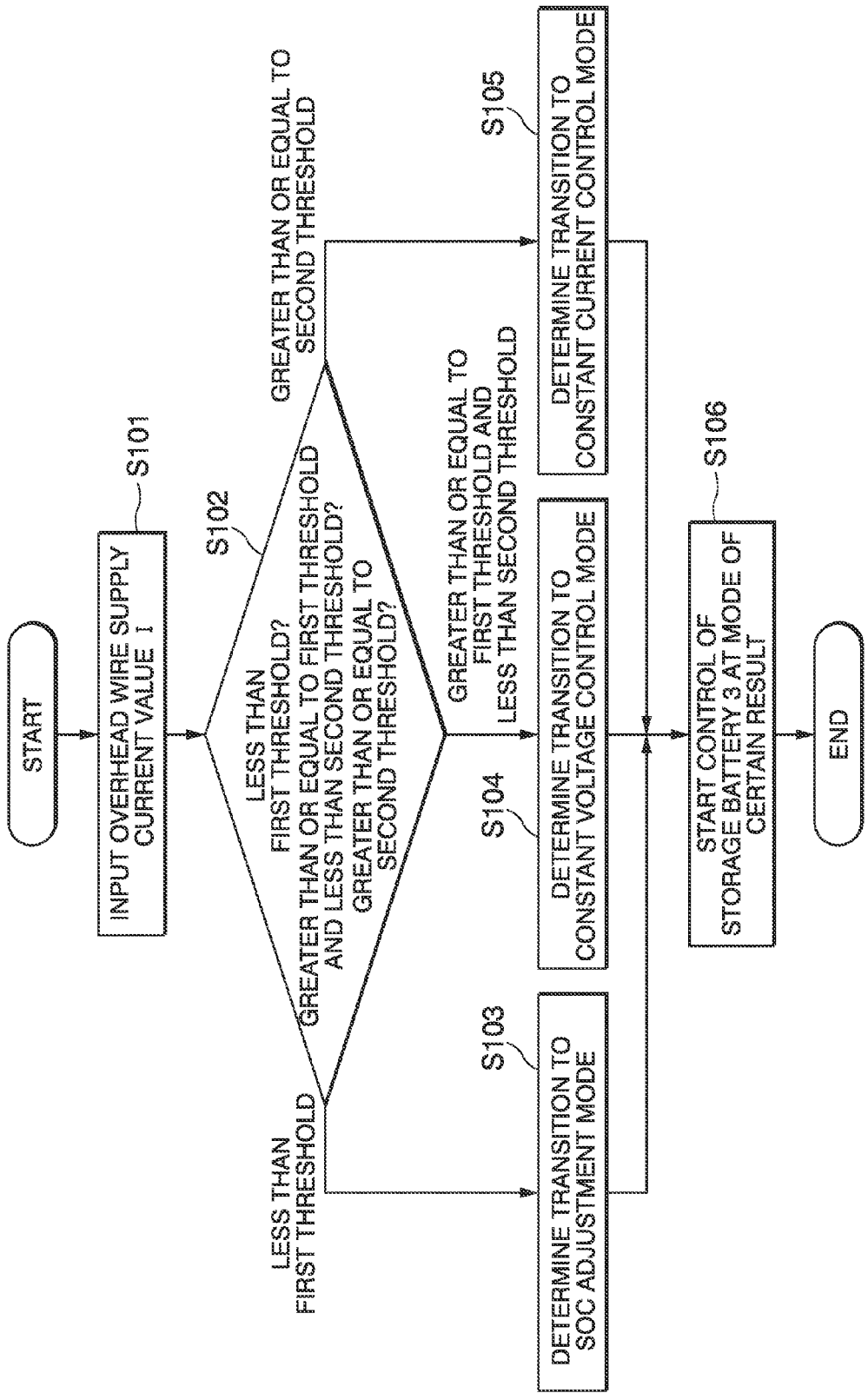
FIG. 3 is a view showing a processing flow of a storage battery control device.

FIG. 3 is a view showing a processing flow of the storage battery control device.

Next, the processing flow of the storage battery control device 4 will be sequentially described with reference to FIG. 3.

First, the mode determination unit 41 of the storage battery control device 4 inputs the overhead wire supply current value I obtained from the ammeter 7 (Step S101), and determines whether the value is less than the first threshold, greater than or equal to the first threshold or less than the second threshold, or greater than or equal to the second threshold (Step S102). Then, the mode determination unit 41 determines transition to the SOC adjustment mode when a value of the overhead wire supply current value I is less than the first threshold (Step S103), determines transition to the constant voltage control mode when a value of the overhead wire supply current value I is greater than or equal to the first threshold and less than the second threshold (Step S104), and determines transition to the constant current control mode when a value of the overhead wire supply current value I is greater than or equal to the second threshold (Step S105). The mode determination unit 41 outputs information showing the mode of the determination result to the current voltage control unit 42. Next, when the current voltage control unit 42 inputs the information showing the mode of the determination result, control of the storage battery 3 in the input mode starts (Step S106).

In addition, when the overhead wire supply current value I is reduced by a decrease in the load of the overhead wire transportation system, the storage battery control device 4 enters the SOC adjustment mode and controls charging and discharging of the storage battery 3 in such a way that the charging rate of the storage battery 3 becomes the charging rate target value. Here, it is necessary to secure some extent of a situation which the overhead wire supply current value I becomes less than the first threshold in order to control charging and discharging of the storage battery 3 in such a way that a time, which reaches at the charging rate target value of the charging rate of the storage battery 3 in per unit time, becomes more than a predetermined desired time. Accordingly, a simulation of transition of the overhead wire supply current value I according to a lapse of time is performed with a service schedule of the vehicle or a position of the vehicle based on a position of the ammeter 7. In addition, the simulation of the transition of the charging rate per unit time of the storage battery 3 by the transition of the overhead wire supply current value I is separately performed by varying the first threshold. Further, the simulation processing may be performed by the storage battery control device 4. Accordingly, the first threshold is previously obtained when the time, which reaches at the charging rate target value of the charging rate of the storage battery 3 in per unit time, becomes more than a predetermined desired time, and set it to the storage battery control device 4 to be recorded in a memory unit or the like in the storage battery control device 4. A value shown as the second threshold is a value obtained by adding a maximum current value, which is able to be output by the storage battery 3 and is predetermined based on the performance of the storage battery 3, to the first threshold, and the second threshold is also recorded in the memory unit or the like in the storage battery control device 4.

Figure 4:
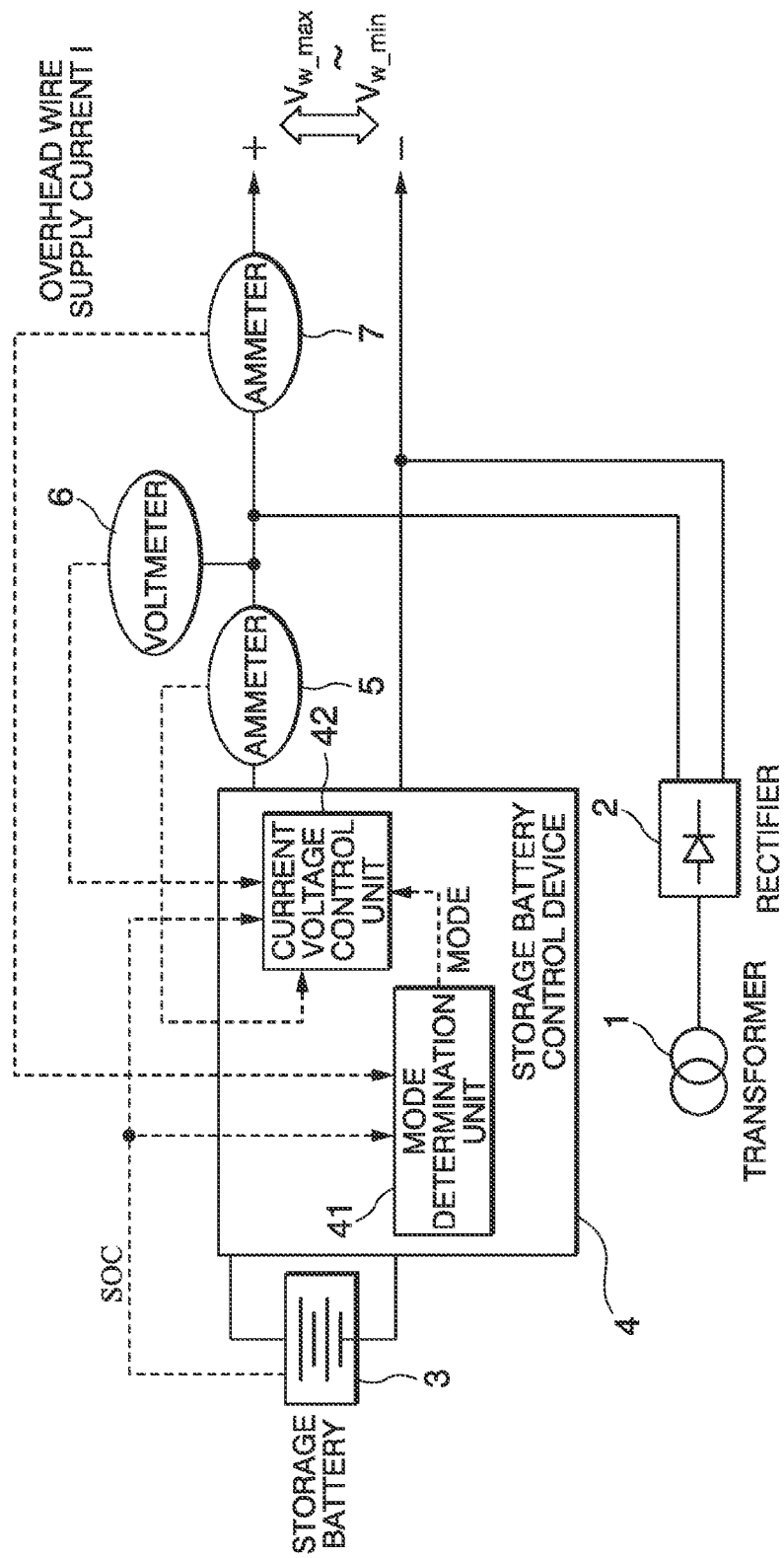
FIG. 4 is a block diagram showing a configuration of an overhead wire transportation system according to a second embodiment.

FIG. 4 is a block diagram showing a configuration of an overhead wire transportation system according to a second embodiment.

A functional configuration of the overhead wire transportation system according to the second embodiment has the overhead wire transportation system according to the first embodiment, and further has a function of detecting the charging rate of the storage battery 3 by the mode determination unit 41 and the current voltage control unit 42, and varying the first threshold to determine whether the system enters the SOC adjustment mode based on the transition of the charging rate thereof according to a lapse of time.

Here, when the overhead wire supply current value I determined as the SOC adjustment mode and less than the first threshold is frequently detected from the ammeter 7, the storage battery control device 4 controls the SOC adjustment mode frequently, and thus a time controlled such that the charging rate of the storage battery 3 becomes the charging rate target value is increased. Accordingly, when there are remarkably many circumstances in which the overhead wire supply current value I less than the first threshold is frequently detected from the ammeter 7, the time in which the charging rate of the storage battery 3 reaches the charging rate target value per unit time largely exceeds a predetermined desired time. Accordingly, even when the first threshold is lowered and a range of the overhead wire supply current value I determined as the SOC adjustment mode is narrowed, the time in which the charging rate of the storage battery 3 reaches the charging rate target value per unit time becomes more than a predetermined desired time.

Then, as the first threshold is lowered, the output voltage value of the storage battery control device 4 in the constant voltage control mode is increased, and thus the current flowing into the vehicle can be controlled to be a smaller amount, which is effective in consideration of energy saving.

In conducting such a process, in the storage battery control device 4 according to the second embodiment, first, the mode determination unit 41 inputs the charging rate showed from the storage battery 3. The mode determination unit 41 records values of the respective charging rates input at predetermined time intervals according to a lapse of time in the memory unit or the like. Then, the mode determination unit 41 obtains an approximate straight line of the charging rates by a least-square method, in a coordinate system showing a relation between the time and the charging rate for example, using the respective charging rates obtained a plurality of recent times.

Then, the mode determination unit 41 determines whether an extension line in a time elapse direction of the approximate straight line reaches the charging rate target value. Specifically, the determination unit 41 performs the determination such that calculating whether the obtained approximate straight line crosses the straight line showing the charging rate target values after the time used to obtain the approximate straight line, and in a case where they crosses, determining the extension line of the approximate straight line coincides with the charging target value.

In addition, the mode determination unit 41 determines whether an inclination of the approximate straight line is more than a predetermined value. When the inclination of the approximate straight line is positively larger than the predetermined value, it is determined that a rate of change per unit time in the charging rate is large. Then, the mode determination unit 41 determines that the time in which the charging rate of the storage battery 3 reaches the charging rate target value per unit time is more than a predetermined desired time, even though the first threshold is lowered and a range of the overhead wire supply current value I determined as the SOC adjustment mode is narrowed when the charging rate target value coincides with the extension line of the approximate straight line and the inclination of the approximate straight line is positively larger than the predetermined threshold. Accordingly, the mode determination unit 41 lowers, for example, the first threshold to a predetermined value and records the value in the memory unit or the like. Then, the mode determination unit 41 determines whether the mode is the SOC adjustment mode or the constant voltage control mode based on the first threshold newly recorded in the memory unit.

In addition, the extent to which the mode determination unit 41 lowers the first threshold may be varied according to the inclination of the approximate straight line. For example, while it is assumed that the inclination of the approximate straight line is positively larger than a predetermined value, within a range of the magnitude of the inclination, a range of reduction of the first threshold is increased when the inclination of the approximate straight line is relatively large (when the value is a higher threshold or more), and a range of reduction of the first threshold is reduced when the inclination is relatively small (when the value is less than the higher threshold).

Further, when the inclination of the approximate straight line is positive but less than a predetermined value, it is possible to determine that the rate of the change per unit time of the charging rate is small. Then, in this case, the mode determination unit 41 may increase the first threshold and record the value in the memory unit or the like.

Figure 5:
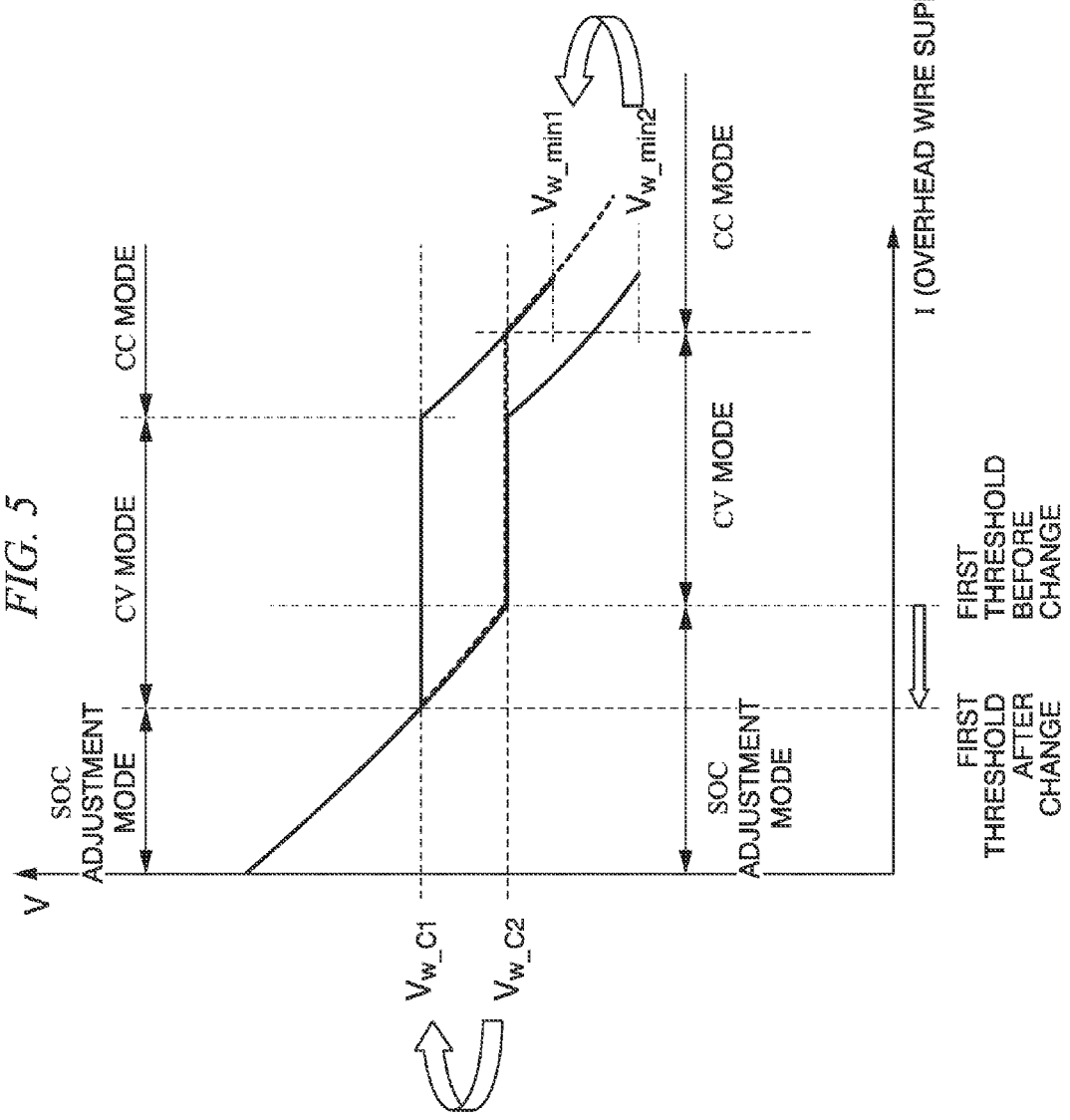
FIG. 5 is a second view showing a control outline of a current voltage control unit.

FIG. 5 is a second view showing a control outline of the current voltage control unit.

As shown in FIG. 5, as a value of the first threshold is lowered, a range of the overhead wire supply current value I determined as the SOC adjustment mode is narrowed. Accordingly, the voltage value in the constant voltage control mode is increased from $Vw_{\_C2}$ to $Vw_{\_C1}$. Accordingly, the current flowing into the vehicle can be controlled to be a smaller amount, which is effective in consideration of energy saving.

Next, in the storage battery control device 4, an example of the case in which the overhead wire voltage applied to the vehicle is controlled so as not to be less than a predetermined minimum lower wire voltage will be described.

As described above, when the electric power consumption is constant, the more the overhead wire voltage applied to the vehicle (corresponding to a pantograph point voltage in a pantograph) is lowered, the more the current flowing into the vehicle equipment such as the IGBT is increased. Accordingly, in general, since the current capacity of the vehicle equipment is limited and the vehicle equipment having a small current capacity has a lower cost, the overhead wire voltage applied to the vehicle preferred to be increased and the amount of current flowing into the vehicle equipment preferred to be controlled to a small amount.

Meanwhile, a maximum current value It that can flow into the vehicle equipment is predetermined and a maximum electric power consumption Pt in the vehicle is obtained by previous measurement. Accordingly, in order to avoid flowing more than the current of the maximum current value It, which is predetermined to be allowed by the vehicle equipment, an allowable minimum overhead wire voltage value Vt applied to the vehicle can be calculated ($Vt=Pt \div It$).

In addition, a value of a voltage drop from the output voltage value of the storage battery control device 4 at the position of vehicle in the overhead wire transportation system can be calculated. Accordingly, provided that the voltage drop from the output voltage value of the storage battery control device 4 at the vehicle position is $\Delta V$, in order for the current value flowing into the vehicle equipment to be less than the maximum current value It, the output voltage of the storage battery control device 4 should have more than a voltage value of the minimum overhead wire supply voltage value Vw ($Vt+\Delta V$), which is a value in which $\Delta V$ is added to the allowable minimum overhead wire voltage value Vt applied to the vehicle. Then, the current voltage control unit 42 of the storage battery control device 4 may store the minimum overhead wire supply voltage value Vw in the memory unit or the like, switch the mode to the constant voltage control mode when the voltage value measured by the voltmeter 6 is less than the minimum overhead wire supply voltage value Vw, and control charging or discharging of the storage battery 3 in such a way that the output voltage value of the storage battery control device 4 detected by the voltmeter 6 is maintained at a constant voltage which is more than the minimum overhead wire supply voltage value Vw. In this case, the first threshold is an overhead wire current value when the output voltage value of the storage battery control device 4 is the minimum overhead wire supply voltage value.

In addition, the voltage drop $\Delta V$ at the vehicle position A from the output voltage at a position B, which is a measurement position of the output voltage of the storage battery control device 4, can be calculated as $\Delta V = I_p \times L \times R$ using a distance L (A–B) which is between the position A and the position B of the storage battery control device 4, a resistance R ($\Omega$/m) per unit distance, and a peak current Ip at a position when a maximum load is applied to the vehicle.

Figure 6:
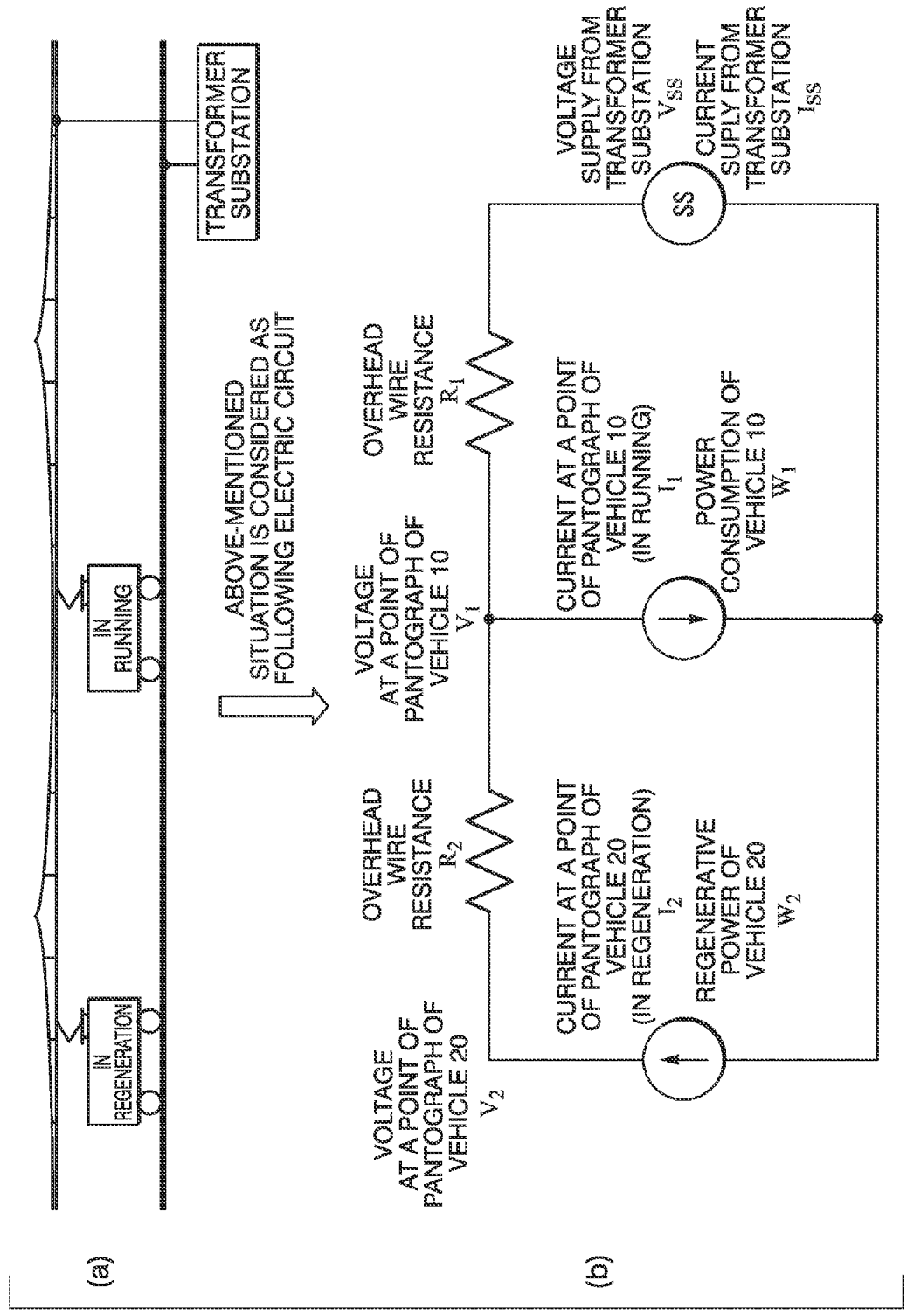
FIG. 6 is a view showing an outline of a calculation process of an overhead wire voltage applied to a vehicle.

FIG. 6 is a view showing an outline of calculation processing of the overhead wire voltage applied to the vehicle.

In an example shown in a section (a) of FIG. 6, two vehicles (a vehicle 10 and a vehicle 20) travel under the overhead wire receiving power from the transformer substation, one vehicle 10 is power running (is traveling using the electric power from overhead wire as electric power of a motor or the like), and the other vehicle 20 is in regeneration. In this case, an electric circuit shown in a section (b) of FIG. 6 can be considered. Here, an overhead wire resistance $R_1$ or $R_2$ can be obtained by a distance between the two vehicles based on the vehicle positions or a distance between a position connected to the overhead wire of the voltmeter 6 configured to measure the output voltage of the storage battery control device 4 and the vehicle position, and a resistance value per a unit length of the overhead wire. Then, provided that a minimum overhead wire supply voltage value (a minimum value of the output voltage) of the storage battery control device 4 is Vw, an overhead wire voltage (a voltage at a point of pantograph) of the vehicle 10 is $V_1$, an overhead wire voltage (a voltage at a point of pantograph) of the vehicle 20 is $V_2$, a current at a point of pantograph of the vehicle 10 is $I_1$, a current at a point of pantograph of the vehicle 20 is $I_2$, and a regenerated electric power in the vehicle 20 is $W_2$, the minimum overhead wire supply voltage value Vw of the storage battery control device 4 which can be less than the maximum current value It allowed in the vehicle equipment of the vehicle 10 or the vehicle 20 is obtained by the following equations. That is, provided that a minimum overhead wire supply voltage value of the storage battery control device 4 which can be less than the maximum current value It in the vehicle equipment of the vehicle 10 is $Vw_{10}$ and a minimum overhead wire supply voltage value of the storage battery control device 4 which can be less than the maximum current value It in the vehicle equipment of the vehicle 20 is $Vw_{20}$, the following equations can be satisfied:

$$Vw_{10} V_1 + R_1(I_1 + I_2),$$

$$Vw_{20} = V_2 + R_2 I_2 + R_1(I_1 + I_2).$$

In addition, $V_2 = (W_2 \div I_2)$.

Then, provided that an allowable minimum overhead wire voltage value of the vehicle 10 is $Vt_{10}$ and an allowable minimum overhead wire voltage value of the vehicle 20 is $Vt_{20}$, the current voltage control unit 42 of the storage battery control device 4 specifies a high value of minimum overhead wire supply voltage values $Vw_{10}$ and $Vw_{20}$ when both of $Vt_{10} < V_1$ and $Vt_{20} < V_2$ are satisfied. The current voltage control unit 42 of the storage battery control device 4 may store the specified minimum overhead wire supply voltage value Vw in the memory unit or the like, switch the mode to the constant voltage control mode when the output voltage value of the storage battery control device 4 measured from the voltmeter 6 is less than the minimum overhead wire supply voltage value Vw, and control charging or discharging of the storage battery 3 in such a way that the output voltage value of the storage battery control device 4 detected by the voltmeter 6 is maintained at a constant voltage which is more than the minimum overhead wire supply voltage value Vw. In this case, the first threshold is an overhead wire current value when the overhead wire voltage value at the position of the vehicle does not become the allowable minimum overhead wire voltage value and the output voltage value of the storage battery control device 4 is the minimum overhead wire supply voltage value.

While the embodiments of the present invention have been described above, according to the control of the above-mentioned storage battery control device 4, the current flowing into the vehicle equipment can be controlled to a small amount less than the allowable capacity, and thus, the vehicle equipment having a small current capacity can be used. In addition, manufacturing cost of the vehicle can be reduced by using the vehicle equipment having a small current capacity.

In addition, the above-mentioned the storage battery control device 4 includes a computer system. The above-mentioned respective processes are stored in a recording medium which is readable by a computer in a program type, and the program is read and performed by the computer, and performing the processes. Here, a computer readable recording medium includes a magnetic disk, a magneto-optical disc, a CD-ROM, a DVD-ROM, a semiconductor memory unit, or the like. Further, the computer program is transmitted to the computer by a communication line, and the computer into which the program is transmitted may perform the program.

In addition, the program may be provided to realize a portion of the above-mentioned functions.

Further, the program may be a program which can be realized by combination with a program having the above-mentioned functions recorded in the computer system, or a differential file (a differential program).

DESCRIPTION OF REFERENCE NUMERALS

1: transformer
2: rectifier
3: storage battery
4: storage battery control device
5, 7: ammeter
6: voltmeter
41: mode determination unit
42: current voltage control unit

The invention claimed is:

1. An overhead wire transportation system in which a vehicle travels by electric power obtained from an overhead wire connected to a transformer substation, the overhead wire transportation system comprising:
a storage battery which stores the electric power obtained from the overhead wire; and
a storage battery control device which controls charging or discharging of the storage battery,
wherein the storage battery control device detects an overhead wire supply current value showing a sum of a current value output from the storage battery control device and a current value output from the transformer substation, a control mode of the storage battery control device is set to a charging rate adjustment mode in which charging or discharging of the storage battery is controlled in such a way that a charging rate of the storage battery becomes a charging rate target value when the detected overhead wire supply current value is less than a first threshold, and the control mode of the storage battery control device is set to a constant voltage control mode in which charging or discharging of the storage battery is controlled in such a way that an output voltage of the storage battery control device is maintained at a constant voltage when the detected overhead wire supply current value is greater than or equal to the first threshold.

2. The overhead wire transportation system according to claim 1, wherein the control mode of the storage battery control device is set to a constant current control mode in which discharge of the storage battery is controlled in such a way that the storage battery control device is discharged at a constant value of a predetermined maximum current value when the detected overhead wire supply current value is greater than or equal to a second threshold, the second threshold being a current value higher than the first threshold.

3. The overhead wire transportation system according to claim 1, wherein the storage battery control device detects the charging rate of the storage battery, and the storage battery control device lowers the first threshold when a rate of change per unit time in a transition from the detected charging rate to the charging rate target value is greater than or equal to a predetermined threshold.

4. The overhead wire transportation system according to claim 3, wherein the storage battery control device raises the first threshold when a rate of change per unit time in the transition from the detected charging rate to the charging rate target value is less than the predetermined threshold.

5. The overhead wire transportation system according to claim 1, wherein the second threshold is a value obtained by adding a maximum current value output from the storage battery control device to a current value shown by the first threshold.

6. The overhead wire transportation system according to claim 1, wherein, in the constant voltage control mode, to control charging or discharging of the storage battery in such a way that an output voltage of the storage battery control device is maintained at a constant voltage, the storage battery control device calculates a minimum overhead wire supply voltage value, which is obtained by adding a voltage drop value from the output voltage of the storage battery control device to an allowable minimum overhead wire voltage value applied to the vehicle, the voltage drop value being a value obtained at a position of the vehicle having allowable minimum overhead wire voltage value, and the storage battery control device controls charging or discharging of the storage battery in such a way that the output voltage of the storage battery control device is maintained at a constant voltage which is more than the minimum overhead wire supply voltage value.

7. The overhead wire transportation system according to claim 6, wherein the first threshold equals to an overhead wire current value when the output voltage of the storage battery control device is the minimum overhead wire supply voltage value.

8. The overhead wire transportation system according to claim 6, wherein the first threshold equals to an overhead wire current value when the overhead wire voltage value applied to the vehicle at a position of the vehicle is the minimum overhead wire supply voltage value, which is not the allowable minimum overhead wire voltage value.

9. A control method of an overhead wire transportation system, in which a vehicle travels by electric power obtained from an overhead wire connected to a transformer substation, including a storage battery which stores the electric power obtained from the overhead wire; and a storage battery control device which controls charging or discharging of the storage battery, the control method of an overhead wire transportation system comprises the steps of:

detecting an overhead wire supply current value showing a sum of a current value output from the storage battery control device and a current value output from the transformer substation in the storage battery control device; and setting a control mode of the storage battery control device to a charging rate adjustment mode in which charging or discharging of the storage battery is controlled in such a way that a charging rate of the storage battery becomes a charging rate target value when the detected overhead wire supply current value is less than a first threshold in the storage battery control device; and setting the control mode of the storage battery control device to a constant voltage control mode in which charging or discharging of the storage battery is controlled in such a way that an output voltage of the storage battery control device is maintained at a constant voltage when the detected overhead wire supply current value is greater than or equal to the first threshold in the storage battery control device.

* * * * *